United States Patent [19]

Focks et al.

[11] 4,282,673
[45] Aug. 11, 1981

[54] FLYING INSECT TRAP

[76] Inventors: Dana A. Focks; John W. Hock, both of P.O. Box 12852, Gainesville, Fla. 32604

[21] Appl. No.: 50,814

[22] Filed: Jun. 21, 1979

[51] Int. Cl.³ .......................... A01M 1/04; A01M 1/06
[52] U.S. Cl. ............................................. 43/113; 43/139
[58] Field of Search ................ 43/113, 139; 362/346, 362/347, 360, 802; 406/154, 192

[56] References Cited

U.S. PATENT DOCUMENTS

| | | | |
|---|---|---|---|
| 1,693,368 | 11/1928 | Cherry | 43/113 |
| 2,058,139 | 10/1936 | Doane | 362/346 X |
| 2,236,698 | 4/1941 | Rector | 43/139 |
| 3,058,257 | 10/1962 | Brophy | 43/113 X |
| 3,305,965 | 2/1967 | Cornell | 43/113 X |
| 3,336,694 | 8/1967 | O'Connell | 43/113 X |

FOREIGN PATENT DOCUMENTS 358817  5/1938  Italy ........................................... 43/113

*Primary Examiner*—Stephen G. Kunin
*Assistant Examiner*—Robert P. Olszewski
*Attorney, Agent, or Firm*—Arthur G. Yeager

[57] ABSTRACT

A device for trapping live flying insects, such as mosquitoes including an electric light reflected by a parabolic reflector horizontally in all directions to attract the mosquitoes, and electric fan to blow the mosquitoes downwardly into a collection bag, and a valve between the fan and the collection bag which is biased to close the entrance to the collection bag when the fan is not operating and to be opened by the force of air from the fan when it is operating.

4 Claims, 10 Drawing Figures

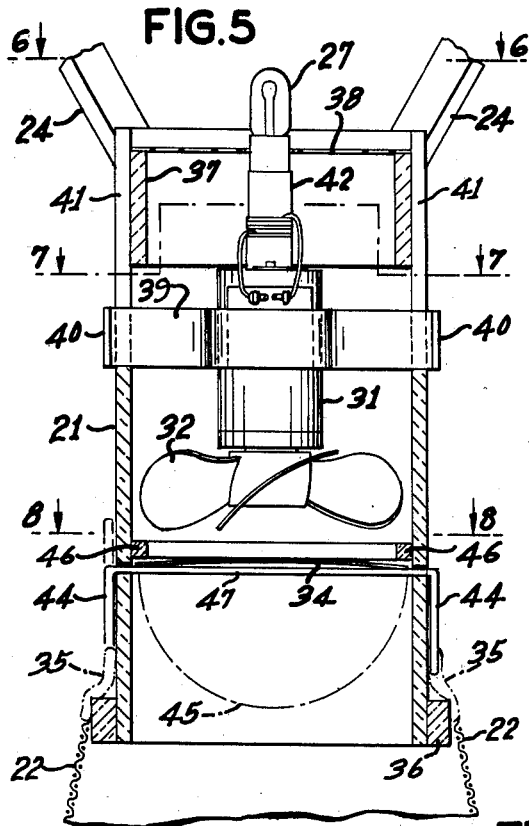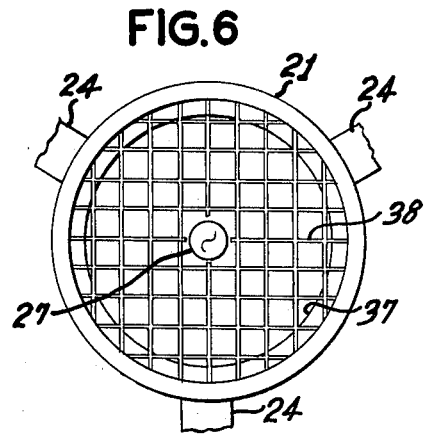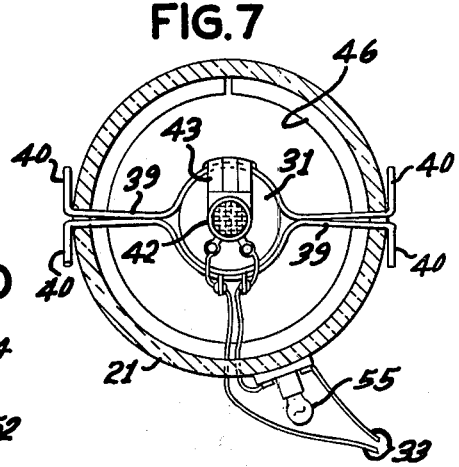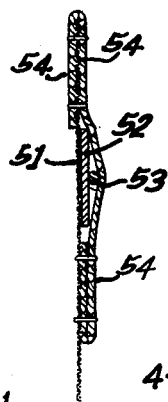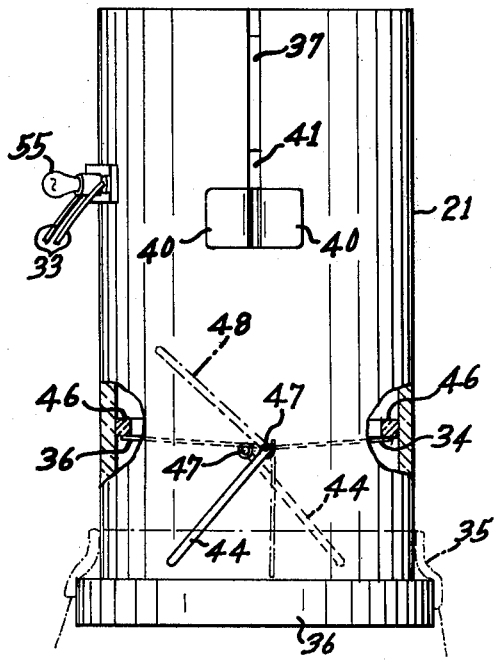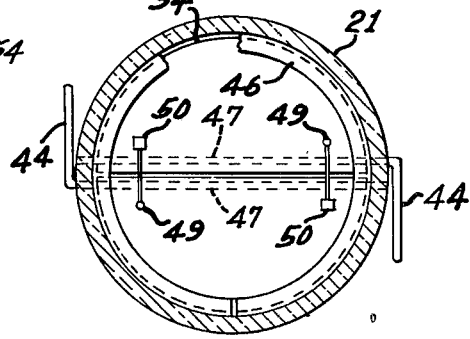

FLYING INSECT TRAP

BACKGROUND OF THE INVENTION

Because mosquitoes, sand flies, and other flying insects are carriers of various diseases it has for many years been considered important to sample flying insect populations at various locations to determine the risk of disease developing in the nearby human and animal populations and to evaluate control efforts. For the most part this work has been undertaken by the Public Health Service, U.S. Department of Health, Education and Welfare. Mosquito traps including an attracting light and a fan for blowing mosquitoes into a bag made of netting have been known for many years. One of the best known is identified as the CDC Minature light trap developed by the Communicable Disease Center of the Public Health Service. The CDC trap has been widely used but it suffers from several disadvantages. The light source has not been employed efficiently. The trapped insects are free to escape if the electric fan ceased operating for any reason. The trap has been restricted for use in areas where it could be serviced each day because of the fact that the insects can escape from the trap once the fan ceases operation, and any period of operation longer than one day required a prohibitively large battery.

It is an object of the present invention to provide an insect trap which does not suffer from the above disadvantages and is capable of operation in remote areas for 3-4 days without attention.

BRIEF SUMMARY OF THE INVENTION

This invention provides an improved flying insect trap comprising an elongated hollow cylindrical body above which is suspended a cover-reflector and below which is removably attached a flexible bag of mosquito netting; the cylindrical body internally supporting an electric fan directed to propel air downwardly against a valve which is biased in such a fashion as to be closed when the fan is not operating and opened by the force of air flow when the fan is operating; the cylindrical body also supporting upstream from the electric fan a screen of a mesh large enough not to impede passage of small flying insects but small enough to prohibit the passage of beetles and similar large size insects; the cylindrical body also supporting an electric light bulb upstream of the beetle screen; the cover-reflector comprising an inverted generally conical reflective surface extending from an apex immediately above the light bulb outwardly for a sufficient distance to extend beyond the vertical projections of all lower portions of the trap, the reflective surface corresponding to half of that generated by rotating a parabola about its latus rectum; the light bulb being located at the focus of the parabola; and a source of electric power for operating the fan and the light bulb. In one embodiment of this invention the valve is a butterfly valve counterbalanced to remain closed when the fan is not operating and to be forced opened by air flow when the fan is operating; preferably the butterfly valve is comprised of two separately counterbalanced semicircular portions. In other embodiments of this invention the valve may be spring biased or it may be a flexible diaphgram which is sufficiently stiff to extend outwardly from its support and close the entire passageway when the fan is not operating but which is sufficiently flexible for its peripheral regions to be deflected when the fan is operating and thus to permit the passage of air and mosquitoes. In still another embodiment of this invention the electric power source is a 6-12 volt battery and the electric fan is powered by totally enclosed 100% ball bearing motor.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the attached drawings and to the following description.

FIG. 5 is a cross sectional view in elevation of the body of the device of this invention shown at a larger scale.

FIG. 6 is a plan view taken at line 6—6 of FIG. 5.

FIG. 7 is a cross sectional view taken at line 7—7 of FIG. 5.

FIG. 8 is a cross sectional view taken at line 8—8 of FIG. 5.

FIG. 9 is a side elevational view of the body as shown in FIG. 5.

FIG. 10 is a cross sectional view taken at line 10—10 of FIG. 1.

DETAILED DESCRIPTION

Figure 1:
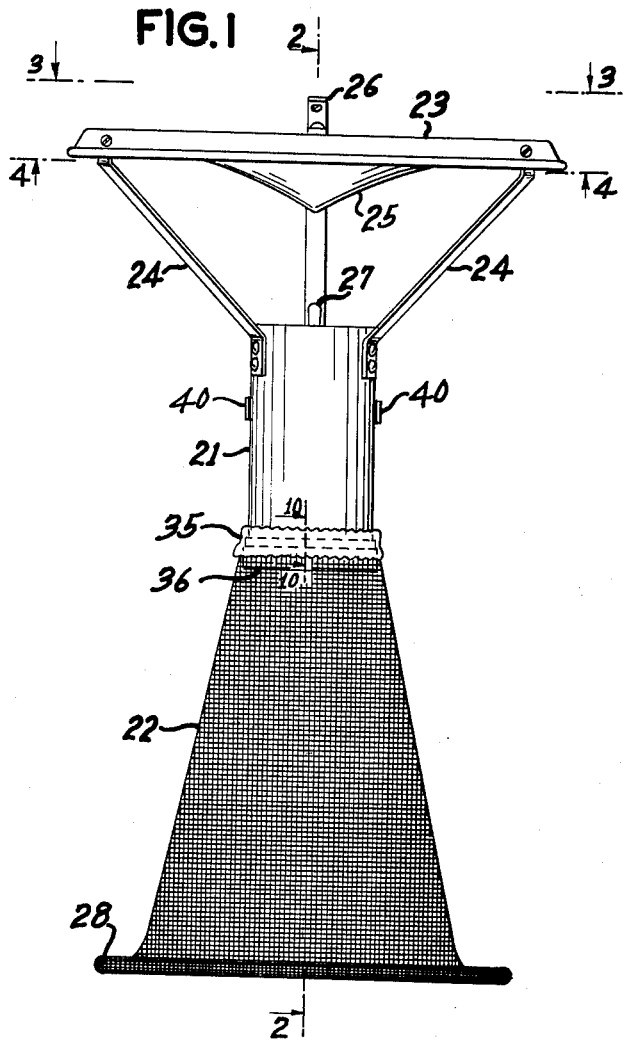
FIG. 1 is an elevational view of the device of this invention
Figure 2:
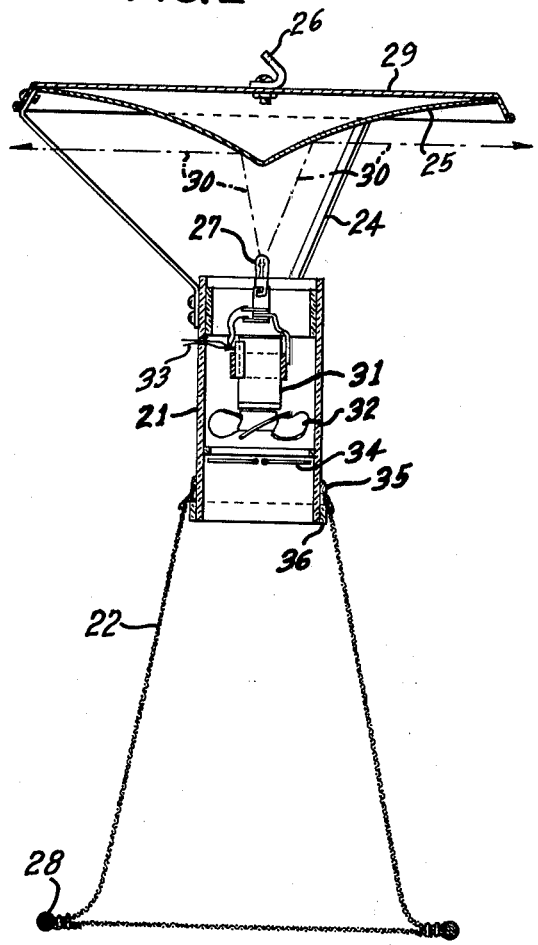
FIG. 2 is a cross sectional view in elevation taken along line 2—2 of FIG. 1.
Figure 3:
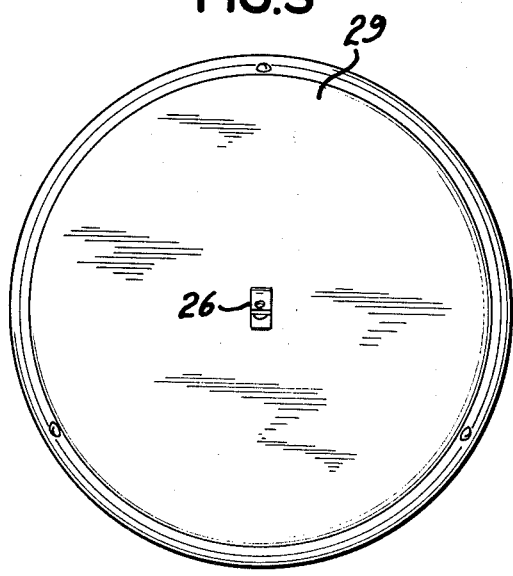
FIG. 3 is a plan view taken in the direction of 3—3 in FIG. 1.
Figure 4:
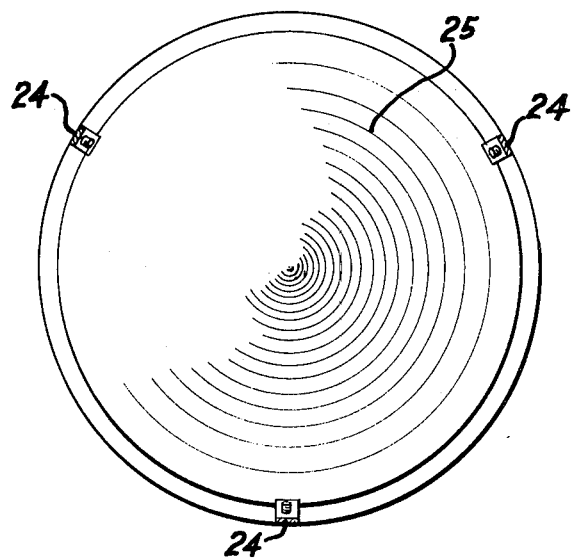
FIG. 4 is a cross section plan view taken at line 4—4 in FIG. 1.

With the particular reference to FIGS. 1,2,3, and 4 the general and specific features of this invention may be illustrated. The working parts of the invention are housed mostly in hollow cylindrical body 21 which may be made of any convenient material such as plastic or lightweight metal. A preferred material of construction is polymethylmethacrylate which has good weather resistance, is relatively inexpensive, easily machined, and transparent so that the working parts may be easily seen. Suspended over the top of body 21, by means of brackets 24 is cover-reflector 23 which consists of a cover portion 29 and a reflector surface 25. Cover-reflector 23 is preferably circular in shape and is of sufficient diameter to extend beyond the vertical projection of all of the lower portions of the device, and thus serves as a rain shield. Attached to the center of cover portion 29 is an eye 26 from which the device could be hung by a rope or wire to a tree or any other support. Depending from the bottom of body 21 is an insect collection bag 22, the top of which fits snugley around the body of 21 and the bottom of which is fitted with a frame 28 to hold the bag in an extended open position defining a substantial interior volume for the collection of insects. Preferably collection bag 22 is made of mosquito netting woven from synthetic plastic filament such as nylon or polyester to provide good wear resistance and weather resistance. Frame 28 is preferably a circular loop of aluminum wire or other lightweight material which is sufficiently stiff to maintain the bottom of the collection bag 22 in an open position. In some embodiments of this invention it is preferred to provide one or more pockets on the outside of bag 22 for receiving balls of cotton soaked in a sucrose solution to serve as food for the trapped mosquitoes to keep them alive until the collection bag is retrieved for analysis.

Cylindrical body 21 supports a small electric motor 31 which drives fan blades 32 directing the flow of air downward. Immediately above electric motor 31 is an electric light bulb 27. The power for driving motor 31 and for lighting bulb 27 comes from a power source which is not shown on this drawing through lead wires 33. The power preferably is a 6–12 volt battery of the lead-acid type. Light from bulb 27 radiates in all directions and that which is radiated upwardly strikes reflective surface 25 and is directed outwardly in a horizontal direction away from that surface as shown by light rays 30. Surface 25 is generally of an inverted conical shape with the apex vertically above light bulb 27. The actual shape of surface 25 is parabolic with the light bulb 27 at the focus of the parabola. The entire surface which may be generally be considered to be closely approaching conical is actually one which is described in mathematical terms as being generated by revolving a parabola about its latus rectum as an axis of revolution and employing only half of the resulting surface, i.e. the portion above or below the plane formed by revolution of the axis of the parabola. One of the specific features of the parabolic surface is that it reflects all rays coming from the focus of the parabola in directions that are parallel to the axis of the parabola. With respect to the present invention this means that all of the light from bulb 27 which strikes reflective surface 25 will be radiated outwardly in all directions horizontal to the ground. This provides the maximum efficiency in light for attracting mosquitoes.

When fan blades 32 are operating to blow air downwardly that air impinges upon valve 34 which is biased in such a fashion that it will open to permit the passage of insects and the flow of air when the fan is operating and will automatically close when the fan is not operating. The details of this valve 34 will be discussed below.

The method of attachment of collection bag 22 to the bottom of cylindrical body 21 is any convenient means which will permit ready removal of bag 22 from body 21. Band 35 may be an elastic material which will stretch far enough to slip over collar 36 at the bottom of body 21. This type of attachment is preferably augumented by a drawstring arrangement to permit a more positive and secure attachment. Other alternative means of attachment are spring clips, snap fasteners, cooperating hooks and eyes, etc. The juncture between body 21 and band 35, must be sufficiently snug to prevent mosquitoes from escaping and yet be readidly removable when the bag is to be detached for analysis of the trapped mosquitoes.

FIG. 5 is an enlarged sectional view of body 21 showing the same arrangement of bulb 27, electric motor 31, fan blades 32, and valve 34 as described previously. Resting on interior support 37 is beetle screen 38 which serves to prohibit beetles and other large insects from entering the trap but which does not impede the passage of smaller flying insects, such as mosquitoes. A suitable screen for this purpose is one which has square openings of about 0.25–0.375 inch on each side of the square.

Electric motor 31 may be supported inside body 21 in any convenient manner. That which is shown in these drawings involves two metal clips 39 which fit tightly around motor 31 and are welded, riveted, or otherwise fastened together in the leg portions extending from motor 31 to the wall of body 21. The outer ends of clips 39 are bent at right angles to form feet 40 which are supported in two vertical slots 41 in the opposite sides of the wall of body 21. Clips 39 rest on the bottom of slots 41. Bulb 27 is supported in socket 42, which in turn, is supported on bracket 43 spot-welded to one of clips 39.

Valve 34 is biased so as to be in the closed position completely blocking the entire internal passage area of body 21 when fan blade 32 are not pumping air. When blades 32 are operating to cause a flow of air downward against valve 34 the bias is overcome and the valve swings to its open position as shown at 45. In the embodiment shown in this drawing the valve takes the form of a butterfly valve comprising two semicircular vanes pivoted about pins 47 which extend through the wall of body 21. The vanes of valve 34 are fixed to pivot pins 47 so that any rotation of one causes a rotation of the other. Pivot pins 47 extend through the wall of body 21 and are bent at right angles to the pivot axis but are also bent at an angle to the vertical so as to form a counterbalance which biases the vanes of valve 34 in a closed position against stop ring 46. The weight and angle of counterbalances 44 are such that the force of air flow produced by fan blades 32 is sufficient to overcome the counterbalance and to swing the vanes of valve 34 to the open position 45.

FIG. 6 shows the general appearance and location of beetle screen 38 at the upper end of body 21 resting on interior support 37.

FIG. 7 shows the general arrangement of metal clips 39 enclosing motor 31 and extending through the wall of body 21 to form feet 40 which support clips 39. Bulb socket 42 is supported by bracket 43 which in turn is spot-welded or otherwise fixed to one of clips 39. The attachment of lead wires to the motor and to the bulb are shown and wires 33 lead through a photoelectric switch to a power source, such a battery which is not shown. In an important embodiment of this invention there is included in the electric circuit between the battery and the electric motor and light bulb a photoelectric device 55 which is set to complete the circuit when darkness occurs at dusk and to open the circuit when there is light at dawn. The fan and light will then automatically turn on at dusk and automatically turn off at dawn to save power.

In FIG. 8 there is shown a modified emodiment of the valve 34 and its counterbalances 44 and pivot pins 47. If counterbalances 44 are not sufficiently heavy or are positioned improperly to provide the weight required to close the valve when the fan is not operating, additional counterbalances 49 may be attached to each of the vanes of valve 34 as shown at 50. The attachment is on one side of the pivot and the weight 49 is on the other side of the pivot so as to provide the counterbalance bias.

In FIG. 9 there is shown a side view of body 21 as shown in FIG. 5. Slot 41 is indicated in body 21 extending downwardly from the upper level of body 21 to a convenient terminus for suspending motor 21 at a convenient level above valve 34. The vanes of valve 34 are shown to be resting against stop ring 46 and held in that closed position by the counterbalance weight of 44 acting upon pivot pins 47. When the fan is in operation the vanes of valve 34 move to the open position, counterbalance 44 will move to the position indicated at 48.

In FIG. 10 there is shown the construction of the band 35 around the top of insect collection bag 22.

Mosquito netting 51 which forms the body of collection bag 22 is attached by sewing or other means to retaining band 54 forming a pocket to enclose elastic band 52 and draw string 53. Elastic band 52 is made of such a size that it must be stretched to pass over collar 36 (FIG. 5) and draw string 53 can then be tightened and tied in a knot to provide a positive secure attachment to body 21.

Other forms of biased valves that are entirely suitable for this invention include any shape of closure such as a ball, a frustoconical surface, or the like which is sufficiently large to cover the entire interior cross section of body 21. The closure is slidably mounted on a central pin and is biased against the bottom of body 21 with a suitable spring that will hold the closure against the bottom of body 21 when the fan is not in operation but will be pushed against the spring to produce an annular opening when the fan is in operation. Still other modifications can be employed in the valve of this device so long as it may be biased to be closed automatically when the fan is not in operation and will be opened by the force of air blown by the fan against the valve.

An important embodiment of this invention is to include a photoelectric switch which will turn the motor and light on at dusk and off at dawn. This type of arrangement permits the trap of this invention to operate unattended for three or more days with a small battery, while the butterfly valve keeps the trapped insects in the collection bag.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An improved flying insect trap comprising an elongated hollow cylindrical body above which is suspended a cover-reflector and below which is removably attached a flexible bag of mosquito netting; said cylindrical body internally supporting an electric fan directed to propel air downwardly against a valve which is biased in such a fashion as to be closed when the fan is not operating and opened by the force of air flow when the fan is operating, said valve comprising two separately counterbalanced semicircular portions; said cylindrical body also supporting upstream from the electric fan a screen of a mesh large enough not to impede the passage of flying insects but small enough to prohibit the passage of beetles or similar large sized insects; said cylindrical body also supporting an electric light bulb upstream of the beetle screen; said cover-reflector, generally extending from immediately above said light bulb outwardly a sufficient distance to extend beyond the vertical projections of all lower portions of the trap; said light bulb being located generally below the center of said cover-reflector; and a source of electric power for operating said fan and said light bulb.

2. The flying insect trap of claim 1 in which said source of electric power is 6 to 12 volt battery and said electric fan is driven by a totally enclosed 100% ball bearing electric motor.

3. The flying insect trap of claim 1 in which the flying insect is a mosquito.

4. The flying insect trap of claim 1 in which there is included a photoelectric switch which permits said fan and said light bulb to operate during the time of darkness and prevents said fan and light bulb from operating during daylight time.

* * * * *